US012694691B2

(12) United States Patent
Kojima et al.

(10) Patent No.: US 12,694,691 B2
(45) Date of Patent: Jul. 28, 2026

(54) IMAGE INFORMATION ACQUISITION APPARATUS, IMAGE INFORMATION ACQUISITION METHOD, AND IMAGE INFORMATION ACQUISITION PROGRAM

(71) Applicant: DENSO CORPORATION, Kariya-city (JP)

(72) Inventors: Sachiko Kojima, Kariya-city (JP); Masato Nishikawa, Kariya-city (JP); Toshikazu Murao, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 0 days.

(21) Appl. No.: 19/065,824

(22) Filed: Feb. 27, 2025

(65) Prior Publication Data

US 2025/0278947 A1     Sep. 4, 2025

(30) Foreign Application Priority Data

Mar. 1, 2024     (JP) ................................ 2024-031402

(51) Int. Cl.
    *G06V 20/56*          (2022.01)
(52) U.S. Cl.
    CPC .................................. *G06V 20/588* (2022.01)
(58) Field of Classification Search
    None
    See application file for complete search history.

(56) References Cited

U.S. PATENT DOCUMENTS

| | | | | |
|---|---|---|---|---|
| 2019/0369635 A1* | 12/2019 | Kobayashi | ........ | B60W 60/0059 |
| 2020/0293042 A1* | 9/2020 | Sakurada | ............ | G05D 1/0293 |
| 2023/0406295 A1* | 12/2023 | Jang | ...................... | B60W 30/09 |

FOREIGN PATENT DOCUMENTS

| | | | | | |
|---|---|---|---|---|---|
| CN | 111010537 B | * | 6/2021 | .......... | H04N 17/002 |
| CN | 111587407 B | * | 1/2024 | .............. | G06N 3/09 |
| CN | 116645424 B | * | 2/2026 | ............ | G06N 3/084 |
| JP | 2002-051331 A | | 2/2002 | | |
| JP | 2007-158642 A | | 6/2007 | | |
| JP | 2009-278428 A | | 11/2009 | | |
| JP | 2018-160759 A | | 10/2018 | | |
| JP | 2019209714 A | * | 12/2019 | ............ | B60W 40/02 |
| JP | 2020149323 A | * | 9/2020 | ............ | G06V 20/56 |
| JP | 2023-016130 A | | 2/2023 | | |
| JP | 7385412 B2 | * | 11/2023 | ........ | B60W 60/0015 |

* cited by examiner

*Primary Examiner* — Mohammed Jebari
(74) *Attorney, Agent, or Firm* — Precision Patents, P.C.

(57)          ABSTRACT

An image information acquisition apparatus acquires image information based on a captured image of surroundings of a vehicle. The acquisition apparatus acquires whether a state of each of a plurality of cameras mounted in the vehicle is a normal state or an abnormal state. The acquisition apparatus generates compensation target object image information corresponding to an abnormal camera in the abnormal state among the cameras, based on compensation source image information based on the captured image acquired by a normal camera in the normal state among the cameras. The acquisition apparatus generates the compensation target object image information, based on: the compensation source image information; and a time difference between a timing at which an image should be captured by the abnormal camera and a timing at which an image is captured by the normal camera regarding the same imaging target object.

8 Claims, 4 Drawing Sheets

IMAGE INFORMATION ACQUISITION APPARATUS, IMAGE INFORMATION ACQUISITION METHOD, AND IMAGE INFORMATION ACQUISITION PROGRAM

CROSS-REFERENCE TO RELATED APPLICATIONS

This application is based on and claims the benefit of priority from Japanese Patent Application No. 2024-031402, filed on Mar. 1, 2024. The entire disclosure of the above application is incorporated herein by reference.

BACKGROUND

The present disclosure relates to an image information acquisition apparatus that acquires image information based on captured images of surroundings of a vehicle, an image information acquisition method, and an image information acquisition program. For cases in which a camera among a plurality of cameras having imaging regions that overlap each other is unable to acquire an image due to an abnormality or failure, various techniques to compensate for the image by using another normal image have been proposed.

SUMMARY

An aspect of the present disclosure provides an image information acquisition apparatus that acquires image information based on a captured image of surroundings of a vehicle. The image information acquisition apparatus acquires whether a state of each of a plurality of cameras mounted in the vehicle is a normal state in which the captured image can be acquired or an abnormal state in which the captured image cannot be acquired. The image information acquisition apparatus generates compensation target object image information that is the image information corresponding to an abnormal camera that is a camera among the plurality of cameras of which the state is the abnormal state, based on compensation source image information that is the image information based on the captured image acquired by a normal camera that is the camera among the plurality of cameras of which the state is the normal state. The image information acquisition apparatus generates the compensation target object image information, based on: the compensation source image information; and a time difference between a timing at which an image should be captured by the abnormal camera and a timing at which an image is captured by the normal camera regarding the same imaging target object.

DESCRIPTION OF THE EMBODIMENTS

Figure 1:
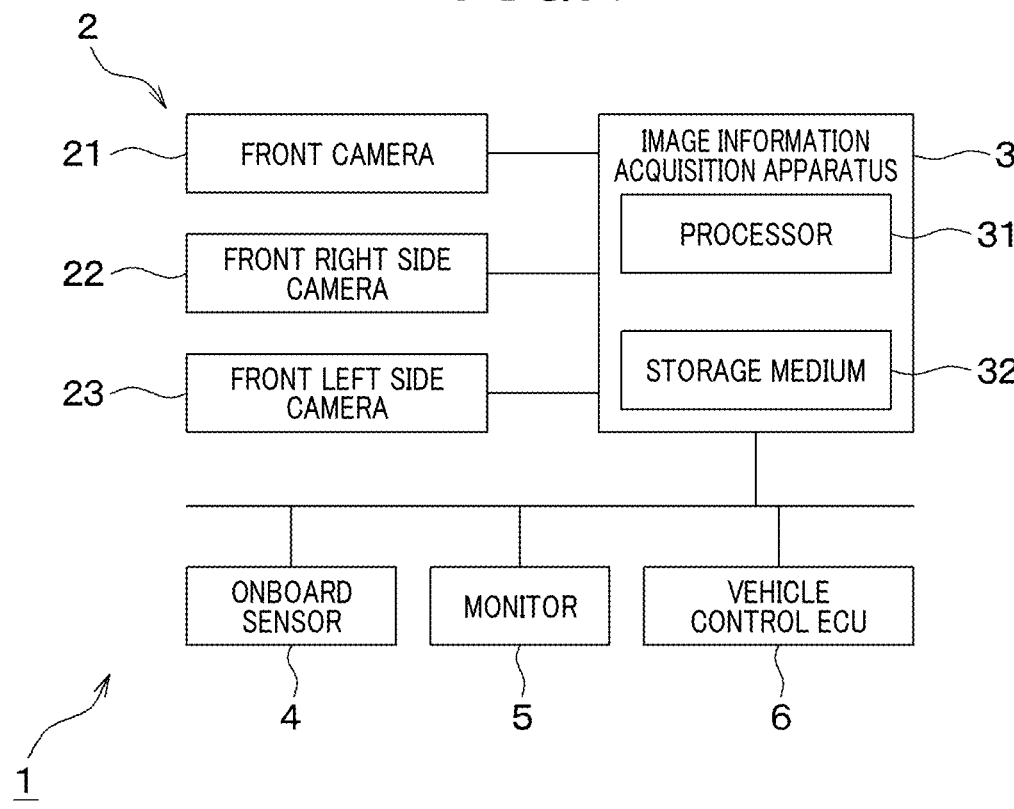
FIG. 1 is a block diagram illustrating an overall configuration of an onboard system including an image information acquisition apparatus according to an embodiment of the present disclosure.

JP 2023-016130 A describes a peripheral monitoring system that includes first to fourth cameras having imaging regions that overlap each other, and controls autonomous driving of a vehicle using the captured images. The peripheral monitoring system determines whether the first to fourth cameras are in a normal state. When a captured image corresponding to an imaging region of any of the cameras cannot be acquired, the peripheral monitoring system continues control of autonomous driving using a captured image acquired from another camera having an overlapping imaging region.

There is still room for improvement in the conventional techniques (for example, refer to JP 2023-016130 A) in which image information is compensated for by image information of another normal camera that serves as the image information that should have been acquired had a camera that is not in a normal state been normal. Specifically, for example, in the conventional techniques, compensation is limited to being made between cameras having imaging regions that overlap each other. In addition, even if compensation is made for image information, imbalance in appearance in displayed images, recognition errors in image recognition, and the like may occur in applications (such as monitors and vehicle control) using the image information. The present disclosure has been achieved in light of the circumstances described as an example above and the like.

A first exemplary embodiment of the present disclosure provides an image information acquisition apparatus that acquires image information based on a captured image of surroundings of a vehicle. The image information acquisition apparatus includes: a camera state acquisition unit that acquires whether a state of each of a plurality of cameras mounted in the vehicle is a normal state in which the captured image can be acquired or an abnormal state in which the captured image cannot be acquired; and an image information generation unit that generates compensation target object image information that is the image information corresponding to an abnormal camera that is a camera among the plurality of cameras of which the state is the abnormal state, based on compensation source image information that is the image information based on the captured image acquired by a normal camera that is the camera among the plurality of cameras of which the state is the normal state, in which the image information generation unit generates the compensation target object image information, based on: the compensation source image information; and a time difference between a timing at which an image should be captured by the abnormal camera and a timing at which an image is captured by the normal camera regarding the same imaging target object.

A second exemplary embodiment of the present disclosure provides an image information acquisition method performed by an image information acquisition apparatus that acquires image information based on a captured image of surroundings of a vehicle. The image information acquisition method acquires whether a state of each of a plurality of cameras mounted in the vehicle is a normal state in which the captured image can be acquired or an abnormal state in which the captured image cannot be acquired; and generates compensation target object image information that is the image information corresponding to an abnormal camera that is a camera among the plurality of cameras of which the state is the abnormal state, based on compensation source image information that is the image information based on the captured image acquired by a normal camera that is the camera among the plurality of cameras of which the state is the normal state. The compensation target object image information is generated, based on: the compensation source image information; and a time difference between a timing at which an image should be captured by the abnormal camera and a timing at which an image is captured by the normal camera regarding the same imaging target object.

A third exemplary embodiment of the present disclosure provides a non-transitory computer-readable storage medium storing therein an image information acquisition program executed by an image information acquisition apparatus that acquires image information based on a captured image of surroundings of a vehicle. The image information acquisition program includes, as processes performed by the image information acquisition apparatus: a process for acquiring whether a state of each of a plurality of cameras mounted in the vehicle is a normal state in which the captured image can be acquired or an abnormal state in which the captured image cannot be acquired; and a process for generating compensation target object image information that is the image information corresponding to an abnormal camera that is a camera among the plurality of cameras of which the state is the abnormal state, based on compensation source image information that is the image information based on the captured image acquired by a normal camera that is the camera among the plurality of cameras of which the state is the normal state, in which the process for generating the compensation target object image information generates the compensation target object image information, based on: the compensation source image information; and a time difference between a timing at which an image should be captured by the abnormal camera and a timing at which an image is captured by the normal camera regarding the same imaging target object.

Here, elements may be given reference numbers in parentheses in each section of the application documents. However, the reference numbers merely indicate examples of corresponding relationships between the elements and specific means described according to the embodiments described hereafter. Therefore, the present disclosure is not limited in any way by the reference numbers described above.

EMBODIMENTS

Exemplary embodiments and specific examples of the present disclosure will hereinafter be described with reference to the drawings as appropriate. First, with reference to FIG. 1, an onboard system 1 is configured to perform various operations of a vehicle by being mounted in the vehicle. The vehicle in which the onboard system 1 is mounted is referred to, hereafter, as an "own vehicle V" (see FIG. 3). According to the present embodiment, the onboard system 1 includes a plurality of cameras 2 that capture images of the surroundings of the own vehicle V. The onboard system 1 is configured to perform various operations, such as display to passengers, recording, and ADAS operations, in the own vehicle V using the captured images from the cameras 2. ADAS is an abbreviation of Advanced Driver-Assistance System.

The onboard system 1 includes the cameras 2, an image information acquisition apparatus 3, an onboard sensor 4, a monitor 5, and a vehicle control ECU 6. ECU is an abbreviation of Electronic Control Unit. The cameras 2 and the image information acquisition apparatus 3 are connected such as to be capable of transmitting and receiving information and signals therebetween. The image information acquisition apparatus 3 is connected to the onboard sensor 4, the monitor 5, and the vehicle control ECU 6 by an onboard network such as to be capable of transmitting and receiving information and signals therebetween. The onboard network is configured in compliance with a predetermined communication standard such as CAN (International Registered Trademark: International Registration Number 1048262A). CAN (International Registered Trademark) is an abbreviation of Controller Area Network. Here, the onboard network may include, in addition to a main network compliant with CAN (International Registered Trademark), a subnetwork that is in compliance with LIN, FlexRay, or the like. LIN is an abbreviation of Local Interconnect Network. Overall configurations or functions of each section of the onboard system 1 will be described in order, below.

The camera 2 includes an image sensor such as a CCD or a CMOS, and is mounted in a predetermined position in the own vehicle V to capture an image of a target object in the surroundings of the own vehicle V. CCD is an abbreviation of Charge Coupled Device. CMOS is an abbreviation of Complementary Metal Oxide Semiconductor. The "target object" includes, in addition to a three-dimensional object that may become an obstacle to traveling, such as a pedestrian or another vehicle, traffic lights, road markings, road signs, and the like. According to the present embodiment, the onboard system 1 includes at least a front camera 21, a front right side camera 22, and a front left side camera 23 as the plurality of cameras 2. The front camera 21 is provided such that an area ahead of the own vehicle V is an imaging region. The front right side camera 22 is provided such that an area diagonally ahead to the right and an area to the right of the own vehicle V are the imaging region. The front left side camera 23 is provided such that an area diagonally ahead to the left and an area to the left of the own vehicle V are the imaging region.

The image information acquisition apparatus 3 is configured to acquire image information to be displayed in the monitor 5 and used in image recognition for driving control of the own vehicle V in the vehicle control ECU 6, based on the captured images of the surroundings of the own vehicle V from the cameras 2. According to the present embodiment, the image information acquisition apparatus 3 has a configuration as an image processing ECU or an image recognition ECU that is an onboard computer. That is, the image information acquisition apparatus 3 includes a processor 31 and a storage medium 32 connected to the processor 31 to be capable of communicating information therebetween. In addition, the image information acquisition apparatus 3 is configured to actualize a predetermined function for image display or object recognition regarding the surroundings of the own vehicle V as a result of the processor 31 reading and running a computer program from the storage medium 32.

The processor 31 includes at least a single calculation unit that is configured as a central processing unit (CPU) or a microprocessor unit (MPU), and a peripheral circuit (such as a timer circuit) thereof. The storage medium 32 includes, among various types of non-transitory, tangible storage media such as a ROM and a non-volatile rewritable memory, at least the ROM or the non-volatile rewritable memory. The non-volatile rewritable memory is a storage device that holds information in a rewritable manner while power is turned on and holds information in a non-rewritable manner while power is turned off. For example, the non-volatile rewritable memory is a flash memory. In addition to the above-described computer program, various types of data such as initial values, maps, and look-up tables required to run the computer program are stored in the storage medium 32. Further details of the functions of the image information acquisition apparatus 3 will be described hereafter.

The onboard sensor 4 is provided to detect various quantities related to a driving state of the own vehicle V. The "driving state" includes a driving operation state, a driving behavior state, and a traveling environment state of the own vehicle V. The "driving operation state" is a state of the own vehicle V related to driving operation input by a driver of the own vehicle V or the vehicle control ECU 6. The "driving behavior state" is a state of the own vehicle V related to movement or behavior, and for example, includes vehicle speed, acceleration, and yaw rate. The "traveling environment state" refers to a state of an environment surrounding the own vehicle V other than a state of the target object that is to be captured by the camera 2, and for example, includes brightness, weather, outside air temperature, and a road surface state surrounding the own vehicle V.

The monitor 5 includes at least a single display device composed of an organic EL panel, a liquid crystal panel, or the like to display image information based on the captured images from the cameras 2. EL is an abbreviation of Electro Luminescence. The organic EL panel may also be referred to as OLED. OLED is an abbreviation of Organic Light Emitting Diode. The monitor 5 is provided inside a vehicle cabin of the own vehicle V such as to be easily viewed by a passenger (such as the driver).

The vehicle control ECU 6 has a configuration as a so-called driving ECU that is an onboard computer that controls a driving force generation mechanism, a driving force transmission mechanism, a braking mechanism, a steering mechanism, and the like of the own vehicle V. Specifically, according to the present embodiment, the vehicle control ECU 6 is a so-called driving automation ECU and is configured to actualize a driving automation function of the own vehicle V. "Driving automation" refers to actualization of any of driving automation levels from level 1 to level 5 prescribed by a standard "SAE J3016" published by SAE International. That is, "driving automation" includes "driving assistance" and "automated driving." "Driving assistance" includes "driving assistance" of a narrow definition in which both a longitudinal-direction vehicle driving control subtask and a lateral-direction vehicle driving control subtask are not simultaneously performed, and "advanced driving assistance" in which both are simultaneously performed. The longitudinal-direction vehicle driving control subtask is start, acceleration, and stop. The lateral-direction vehicle driving control subtask is steering.

Image Information Acquisition Apparatus

Figure 2:
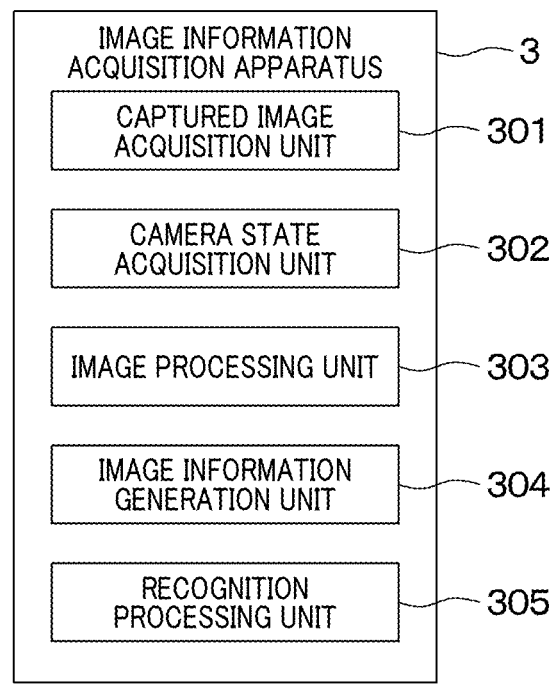
FIG. 2 is a block diagram illustrating an overall functional configuration actualized by the image information acquisition apparatus shown in FIG. 1.
Figure 3:
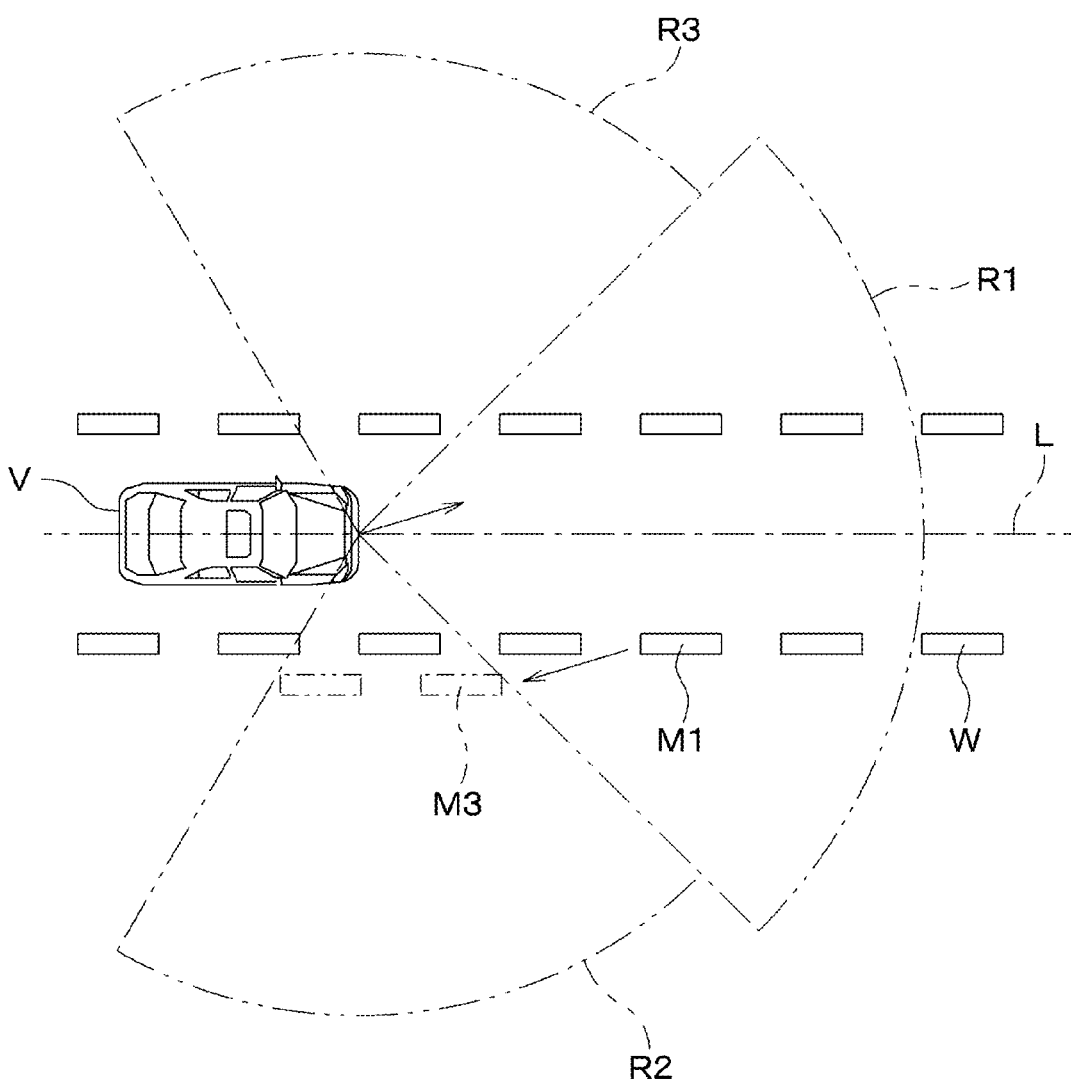
FIG. 3 is a schematic diagram illustrating a vehicle in which the onboard system shown in FIG. 1 is mounted, the vehicle being shown in a traveling state.

As shown in FIG. 2, the image information acquisition apparatus 3 includes, as functional configurations actualized on an onboard microcomputer through execution of a computer program, a captured image acquisition unit 301, a camera state acquisition unit 302, an image processing unit 303, an image information generation unit 304, and a recognition processing unit 305. FIG. 3 shows the own vehicle V in a traveling state. Hereafter, details of the functional configurations of the image information acquisition apparatus 3 will be described with reference not only to FIG. 1, but also FIG. 2 and FIG. 3.

The captured image acquisition unit 301 acquires captured image information from each of the plurality of cameras 2. The camera state acquisition unit 302 acquires whether a camera state, that is, a state of each of the plurality of cameras 2 mounted in the own vehicle V is a normal state in which captured images can be acquired or an abnormal state in which captured images cannot be acquired. Specifically, according to the present embodiment, the camera state acquisition unit 302 determines the camera state of the camera 2 based on input information including the captured image information from the camera 2. The image processing unit 303 performs various types of known image processing such as luminance correction on the acquired captured image information.

The image information generation unit 304 generates image information used for display in the monitor 5 and image recognition by the recognition processing unit 305, based on the captured image information after image processing. In addition, the image information generation unit 304 compensates for image information corresponding to an abnormal camera of which the camera state is the abnormal state with image information acquired using a normal camera of which the camera state is the normal state. The image information corresponding to the abnormal camera, that is, image information estimated to be that which should have been acquired had the abnormal camera been in the normal state is referred to as "compensation target object image information." In contrast, the image information that is based on a captured image acquired by the normal camera and serves as a source for generation of the compensation target object image information is referred to as "compensation source image information." In addition, an operation to generate the compensation target object image information based on the compensation source image information is referred to as an image compensation operation.

Hereafter, an overview of the image compensation operation by the image information generation unit 304 according to the present embodiment will be described with reference not only to FIG. 1 and FIG. 2, but also FIG. 3. In FIG. 3, a center line L is a vehicle center line of the own vehicle V extended in an advancing direction. A front imaging region R1 indicates the imaging region of the front camera 21. A front right side imaging region R2 indicates the imaging region of the front right side camera 22. A front left side imaging region R3 indicates the imaging region of the front left side camera 23. Here, in FIG. 3, the front imaging region R1, the front right side imaging region R2, and the front left side imaging region R3 are shown to spread from a position on the center line L in front of the own vehicle V. However, this is merely from the perspective of simplifying the drawing, that is, facilitating understanding of the drawing. Therefore, in actuality, the front camera 21, the front right side camera 22, and the front left side camera 23 may be mounted in positions differing in a vehicle width direction and an overall vehicle length direction. This similarly applies to FIG. 5 corresponding to a modification described hereafter.

According to the present embodiment, as shown in FIG. 3, the front imaging region R1 does not include overlapping regions with the front right side imaging region R2 and the front left side imaging region R3. That is, the front camera 21 does not have overlapping imaging regions with the front right side camera 22 and the front left side camera 23. In a similar manner, the front right side imaging region R2 and the front left side imaging region R3 do not include imaging regions that overlap each other. In cases of a camera arrangement in which the imaging regions do not overlap each other, a favorable image compensation operation cannot be performed in image information compensation techniques using overlapping imaging regions, such as conventional techniques.

Therefore, the image information generation unit 304 calculates a time difference between a timing at which an image should be captured by an abnormal camera and a timing at which an image is captured by a normal camera regarding the same imaging target object. This time difference can be calculated based on the camera arrangement and the driving state including the traveling speed of the own vehicle V. Then, the image information generation unit 304 generates the compensation target object image information based on the calculated time difference and the compensation source image information. That is, the image information generation unit 304 acquires the compensation target object image information by applying the time difference to the compensation source image information.

Specifically, for example, a case in which the front right side camera 22 is the abnormal camera and the front camera 21 is the normal camera 21 is assumed with reference to FIG. 3. In this case, the time difference is the difference in imaging timing. More specifically, a section amounting to a single linear painted section of a broken-line road lane marker W in an area on the right side of the center line L in the front imaging region R1 is a compensation source shape M1. A time difference based on the camera arrangement and the driving state, such as the traveling speed and the yaw rate, of the own vehicle V occurs until the compensation source shape M1 moves to a position of a compensation target object shape M3 inside the front right side imaging region R2. Therefore, rather than immediately setting the image information including the compensation source shape M1 as the compensation target object image information, the image information generation unit 304 delays the image information by the time difference and sets the delayed image information as the compensation target object image information. As a result, image information display based on a captured image from the front left side camera 23 that is in the normal state and image information display based on the compensation target object image information can be displayed in the monitor 5 without a sense of incongruity. In addition, decrease in recognition accuracy for the road lane marker W on the right side of the own vehicle V can be favorably suppressed.

Operation Example

An overview of the image compensation operation by the image information acquisition apparatus 3 according to the present embodiment will be described, together with effects achieved through an image information acquisition method and an image information acquisition program executed by the image information acquisition apparatus 3, with reference not only to FIG. 1 to FIG. 3, but also to a flowchart in FIG. 4. Here, in the flowchart shown in FIG. 4, "S" is an abbreviation of "step." In addition, the image information acquisition apparatus 3 according to the present embodiment, and the image information acquisition method and the image information acquisition program executed by the image information acquisition apparatus 3 may be collectively referred to, hereafter, as the "present embodiment."

Figure 4:
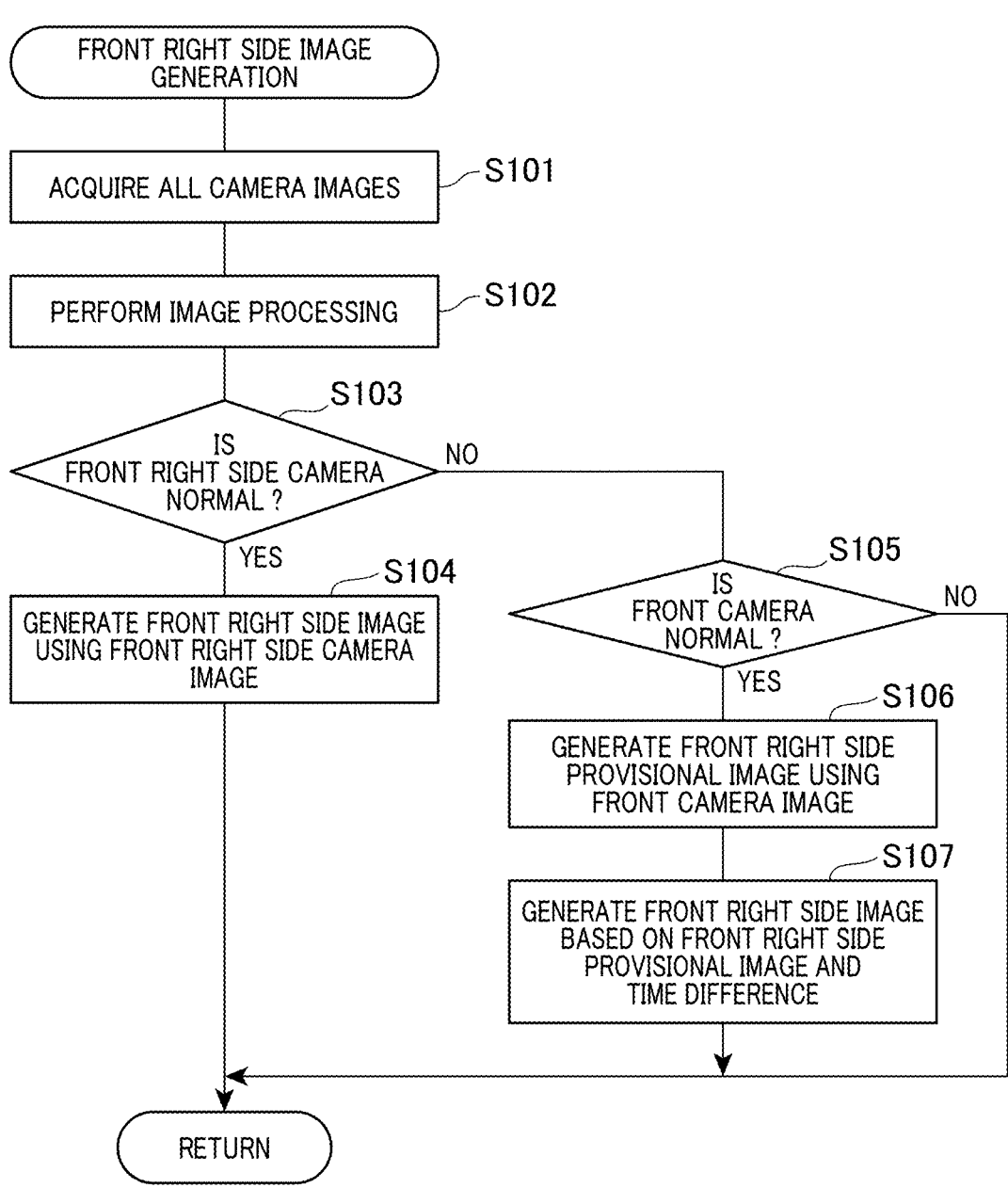
FIG. 4 is a flowchart illustrating an overview of an example of operations of the image information acquisition apparatus shown in FIG. 2.

The flowchart shown in FIG. 4 shows a process for generating, that is, acquiring the front right side image information that is the image information corresponding to the front right side camera 22, that is, the front right side imaging region R2. The processor 31 of the image information acquisition apparatus 3 performs a front right side image generation routine shown in FIG. 4 at a predetermined time (such as 10 msec) interval, while a predetermined execution condition (such as a shift position) is met.

When this routine is performed, first, at step S101, the processor 31 acquires the captured image information from each of the plurality of cameras 2. Next, at step S102, the processor 31 performs predetermined image processing on the acquired captured image information. Next, at step S103, the processor 31 determines whether the front right side camera 22 is in the normal state or the abnormal state.

When determined that the front right side camera 22 is in the normal state (that is, YES at step S103), the processor 31 temporarily ends the present routine after performing a process at step S104. At step S104, the processor 31 generates the front right side image information based on the image actually captured by the front right side camera 22.

When determined that the front right side camera 22 is in the abnormal state (that is, NO at step S103), the processor 31 advances the process to step S105. At step S105, the processor 31 determines whether the front camera 21 is in the normal state.

When determined that the front camera 21 is in the normal state (that is, YES at step S105), the processor 31 temporarily ends the present routine after performing processes at step S106 and step S107. At step S106, the processor 31 generates front right side provisional image information based on an image captured by the front camera 21. At step S107, the processor 31 calculates the above-described time difference, and generates the front right side image information based on the time difference and the front right side provisional image information. As a result, the front right side image information that is the front right side provisional image information delayed by the above-described time difference is acquired. In contrast, when determined that the front camera 21 is in the abnormal state (that is, NO at step S105), the processor 31 skips the processes at step S106 and step S107, and temporarily ends the present routine.

In this manner, according to the present embodiment, if the imaging target object is the same, image compensation can be performed regardless of presence/absence of overlapping in imaging regions, and without causing issues such as imbalance in appearance in displayed images and recognition error in image recognition. Therefore, according to the present embodiment, the image information corresponding to the abnormal camera of which the camera state is the abnormal state can be favorably compensated for by the image information acquired using the normal camera of which the camera state is the normal state.

Modifications

The present disclosure is not limited to the above-described embodiments and specific examples. Therefore, the above-described embodiments and the like can be modified as appropriate. Representative modifications are described below. In the description of the modifications below, differences from the above-described embodiments and the like will mainly be described. In addition, sections that are identical or equivalent to each other among the above-described embodiments and the like, and the modifications described below are given the same reference numbers. Therefore, in the description of the modifications below, the description according to the above-described embodiments and the like are applicable as appropriate regarding constituent elements having the same reference numbers as those according to the above-described embodiments and the like, unless technical conflicts arise or additional descriptions are particularly given.

The present disclosure is not limited to specific purposes and apparatus configurations according to the above-described embodiments. That is, for example, the own vehicle V may be a so-called automobile or may be a motorcycle. The type of automobile or motorcycle is not particularly limited. Intended use of the acquired image information is also not particularly limited. For example, the image information can be used in an around view (also called as surround view or bird's-eye view) monitor, a blind spot monitor, or an electronic side-view mirror, as well as for white line recognition, road marking recognition, pedestrian recognition, and the like.

Figure 5:
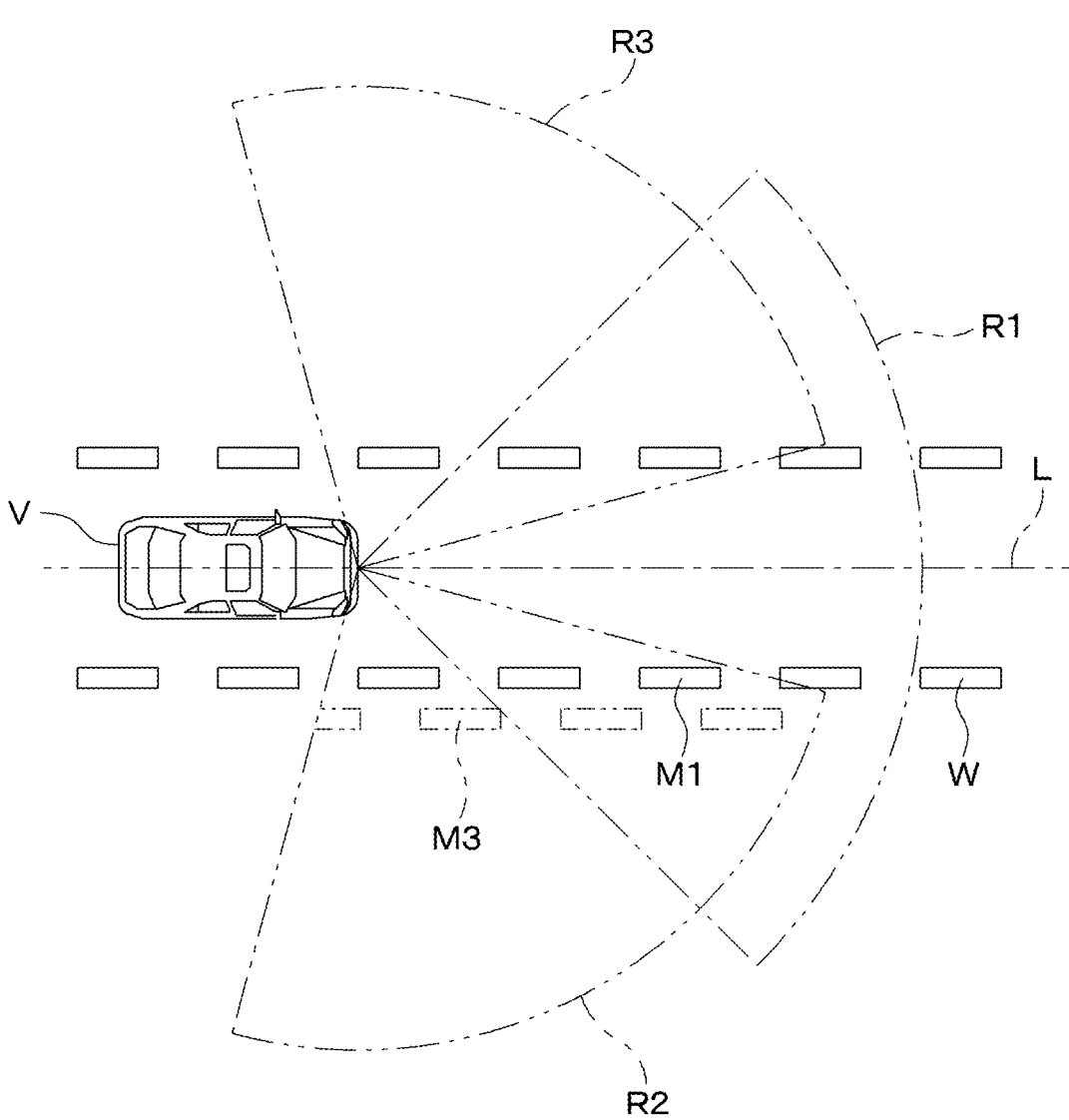
FIG. 5 is a schematic diagram illustrating a vehicle in which a modification of the onboard system shown in FIG. 1 is mounted, the vehicle being shown in a traveling state.

As shown in FIG. 5, the present disclosure can also be suitably applied to an aspect in which the front imaging region R1 has overlapping regions with the front right side imaging region R2 and the front left side imaging region R3. In addition, according to the above-described embodiments, the front camera 21, the front right side camera 22, and the front left side camera 23 are given as examples of the plurality of cameras 2 to simplify the drawings and the descriptions. However, the present disclosure is not limited to this aspect. That is, for example, cameras other than the front camera 21, the front right side camera 22, and the front left side camera 23 (such as a front wide-angle camera) may be provided as the plurality of cameras 2 to acquire the front and front side image information of the vehicle V. Furthermore, for example, the present disclosure may be suitably applied to acquisition of rear and rear side image information of the own vehicle V using a rear camera, a rear right side camera, and a rear left side camera.

The image information acquisition apparatus 3 in its entirety or in part may be configured to include a digital circuit, such as an ASIC or an FPGA, configured to be capable of actualizing functions or operations such as those described above. ASIC is an abbreviation of Application Specific Integrated Circuit. FPGA is an abbreviation of Field Programmable Gate Array. That is, an onboard microcomputer portion and a digital circuit portion may coexist in the image information acquisition apparatus 3.

The computer program of the present disclosure enabling execution of various operations, steps, or processes, described according to the above-described embodiments, may be downloaded or upgraded over V2X communication. V2X is an abbreviation of Vehicle to X. Alternatively, the computer program may be downloaded or upgraded over a terminal device provided in a manufacturing plant of the vehicle V, a maintenance facility, a dealership, or the like. A storage destination of the computer program may be a memory card, an optical disc, a magnetic disk, or the like.

In this manner, the functional configurations and processes described above may be actualized by a dedicated computer that is provided such as to be configured by the processor 31 and the storage medium 32, the processor 31 being programmed to provide one or a plurality of functions that are realized by a computer program. Alternatively, the functional configurations and processes described above may be actualized by a dedicated computer that is provided by the processor 31 being configured by a single dedicated hardware logic circuit or more. Still alternatively, the functional configurations and processes described above may be actualized by a single dedicated computer or more, the dedicated computer being configured by a combination of a single processor 31 or more that is programmed to provide a single or a plurality of functions and a single storage medium 32 or more, and another single processor 31 or more configured by a single hardware logic circuit or more. In addition, the computer program may be stored in a non-transitory, tangible storage medium that can be read by a computer as instructions performed by the computer. That is, the functional configurations and processes described above can also be expressed as a computer program including steps to actualize the functional configurations and processes, or a non-transitory, tangible storage medium storing the computer program therein.

The present disclosure is not limited to the specific functions and operation modes described according to the above-described embodiments. That is, for example, the camera state acquisition unit 302 may be configured to acquire the camera state of each of the plurality of cameras 2 by receiving the camera state from a camera ECU provided in each of the plurality of cameras 2 as a self-diagnosis result from the camera ECU. In addition, in FIG. 4, in cases in which the camera 2 other than the front camera 21 that is capable of compensating for the front right side image information is present, determination of whether the camera 2 is capable of compensation and the image compensation process when the camera 2 is determined to be capable of compensation may be performed as processes when the determination result at step S105 is "NO." Furthermore, according to the above-described embodiments, a specific example of generation of the front right side image information is given to simplify the drawings and the descriptions. However, the present disclosure is not limited to this aspect. That is, processes can be similarly performed for generation of front left side image information corresponding to a case in which the front left side camera 23 is the abnormal camera and the front camera 21 is the normal camera.

Similar expressions such as "acquire," "calculate," "estimate," "detect," and "sense" are interchangeable as long as technical conflicts do not occur. In addition, "exceeds a threshold" and "equal to or greater than a threshold" are interchangeable as long as technical conflicts do not occur. This similarly applies to "below a threshold" and "equal to or less than a threshold."

It goes without saying that an element that configures an above-described embodiment is not necessarily a requisite unless particularly specified as being a requisite, clearly considered a requisite in principle, or the like. In addition, in cases in which a numeric value, such as quantity, numeric value, amount, or range, of a constituent element is stated, the present disclosure is not limited to the specific number unless particularly specified as being a requisite, clearly limited to the specific number in principle, or the like. Similarly, in cases in which a shape, direction, positional relationship, or the like of a constituent element or the like is stated, the present disclosure is not limited to the shape, direction, positional relationship, or the like unless particularly specified as being a requisite, clearly limited to the specific shape, direction, positional relationship, or the like in principle, or the like.

Modifications are also not limited to the examples given above. For example, one of the plurality of specific examples may be combined, in its entirety or in part, with another in its entirety or in part as long as technical conflicts do not occur. The number of specific examples to be combined is also not particularly limited. Similarly, one of the plurality of modifications may be combined, in its entirety or in part, with another in its entirety or in part as long as technical conflicts do not occur. Furthermore, an above-described specific example may be combined, in its entirety or in part, with an above-described modification in its entirety or in part as long as technical conflicts do not occur.

Aspects of the Disclosure

The present specification discloses at least the disclosed matters below, as is clear from the descriptions of the embodiments and modifications above.

Aspect 1-1

An image information acquisition apparatus (3) that acquires image information based on a captured image of surroundings of a vehicle (V), the image information acquisition apparatus including: a camera state acquisition unit (302) that acquires whether a state of each of a plurality of cameras (2) mounted in the vehicle is a normal state in which the captured image can be acquired or an abnormal state in which the captured image cannot be acquired; and an image information generation unit (304) that generates compensation target object image information that is the image information corresponding to an abnormal camera that is a camera among the plurality of cameras of which the state is the abnormal state, based on compensation source image information that is the image information based on the captured image acquired by a normal camera that is the camera among the plurality of cameras of which the state is the normal state, in which the image information generation unit generates the compensation target object image information, based on: the compensation source image information; and a time difference between a timing at which an image should be captured by the abnormal camera and a timing at which an image is captured by the normal camera regarding the same imaging target object.

Aspect 1-2

The image information acquisition apparatus according to aspect 1-1, in which: the image information generation unit calculates the time difference based on a driving state including a traveling speed of the vehicle.

Aspect 1-3

The image information acquisition apparatus according to aspect 1-1 or 1-2, in which: the abnormal camera and the normal camera are provided such that imaging regions do not overlap.

Aspect 1-4

The image information acquisition apparatus according to any one of aspects 1-1 to 1-3, in which: the imaging target object is a road lane marker (W); the normal camera is a front camera (21); and the abnormal camera is a front right side camera (22) or a front left side camera (23).

Aspect 2-1

An image information acquisition method performed by an image information acquisition apparatus (3) that acquires image information based on a captured image of surroundings of a vehicle (V), the image information acquisition method including: acquiring whether a state of each of a plurality of cameras (2) mounted in the vehicle is a normal state in which the captured image can be acquired or an abnormal state in which the captured image cannot be acquired; and generating compensation target object image information that is the image information corresponding to an abnormal camera that is a camera among the plurality of cameras of which the state is the abnormal state, based on compensation source image information that is the image information based on the captured image acquired by a normal camera that is the camera among the plurality of cameras of which the state is the normal state; in which the compensation target object image information is generated, based on: the compensation source image information; and a time difference between a timing at which an image should be captured by the abnormal camera and a timing at which an image is captured by the normal camera regarding the same imaging target object.

Aspect 2-2

The image information acquisition method according to aspect 2-1, in which: the time difference is calculated based on a driving state including a traveling speed of the vehicle.

Aspect 2-3

The image information acquisition method according to aspect 2-1 or 2-2, in which: the abnormal camera and the normal camera are provided such that imaging regions do not overlap.

Aspect 2-4

The image information acquisition method according to any one of aspects 2-1 to 2-3, in which: the imaging target object is a road lane marker (W); the normal camera is a front camera (21); and the abnormal camera is a front right side camera (22) or a front left side camera (23).

Aspect 3-1

A non-transitory computer-readable storage medium storing therein an image information acquisition program executed by an image information acquisition apparatus (3) that acquires image information based on a captured image of surroundings of a vehicle (V), the image information acquisition program including, as processes performed by the image information acquisition apparatus: a process for acquiring whether a state of each of a plurality of cameras (2) mounted in the vehicle is a normal state in which the captured image can be acquired or an abnormal state in which the captured image cannot be acquired; and a process for generating compensation target object image information that is the image information corresponding to an abnormal camera that is a camera among the plurality of cameras of which the state is the abnormal state, based on compensation source image information that is the image information based on the captured image acquired by a normal camera that is the camera among the plurality of cameras of which the state is the normal state; wherein the process for generating the compensation target object image information generates the compensation target object image information, based on: the compensation source image information; and a time difference between a timing at which an image should be captured by the abnormal camera and a timing at which an image is captured by the normal camera regarding the same imaging target object.

Aspect 3-2

The non-transitory computer-readable storage medium according to aspect 3-1, in which: the time difference is calculated based on a driving state including a traveling speed of the vehicle.

Aspect 3-3

The non-transitory computer-readable storage medium according to aspect 3-1 or 3-2, in which: the abnormal camera and the normal camera are provided such that imaging regions do not overlap.

Aspect 3-4

The non-transitory computer-readable storage medium according to any one of aspects 3-1 to 3-3, in which: the imaging target object is a road lane marker (W); the normal camera is a front camera (21); and the abnormal camera is a front right side camera (22) or a front left side camera (23).

What is claimed is:

1. An image information acquisition apparatus that acquires image information based on a captured image of surroundings of a vehicle, the image information acquisition apparatus comprising:
   a camera state acquisition unit that acquires whether a state of each of a plurality of cameras mounted in the vehicle is a normal state in which the captured image can be acquired or an abnormal state in which the captured image cannot be acquired; and
   an image information generation unit that generates compensation target object image information that is the image information corresponding to an abnormal camera that is a camera among the plurality of cameras of which the state is the abnormal state, based on compensation source image information that is the image information based on the captured image acquired by a normal camera that is the camera among the plurality of cameras of which the state is the normal state, wherein
   the image information generation unit generates the compensation target object image information, based on: the compensation source image information; and a time difference between a timing at which an image should be captured by the abnormal camera and a timing at which an image is captured by the normal camera regarding a same imaging target object.

2. The image information acquisition apparatus according to claim 1, wherein:
   the image information generation unit calculates the time difference based on a driving state including a traveling speed of the vehicle.

3. The image information acquisition apparatus according to claim 1, wherein:
   the abnormal camera and the normal camera are provided such that imaging regions do not overlap.

4. The image information acquisition apparatus according to claim 2, wherein:
   the abnormal camera and the normal camera are provided such that imaging regions do not overlap.

5. The image information acquisition apparatus according to claim 1, wherein:
   the imaging target object is a road lane marker;
   the normal camera is a front camera;

and the abnormal camera is a front right side camera or a front left side camera.

6. The image information acquisition apparatus according to claim 2, wherein:
   the imaging target object is a road lane marker;
   the normal camera is a front camera;
   and the abnormal camera is a front right side camera or a front left side camera.

7. An image information acquisition method performed by an image information acquisition apparatus that acquires image information based on a captured image of surroundings of a vehicle, the image information acquisition method comprising:
   acquiring whether a state of each of a plurality of cameras mounted in the vehicle is a normal state in which the captured image can be acquired or an abnormal state in which the captured image cannot be acquired; and
   generating compensation target object image information that is the image information corresponding to an abnormal camera that is a camera among the plurality of cameras of which the state is the abnormal state, based on compensation source image information that is the image information based on the captured image acquired by a normal camera that is the camera among the plurality of cameras of which the state is the normal state; wherein
   the compensation target object image information is generated, based on: the compensation source information; and a time difference between a timing at which an image should be captured by the abnormal camera and a timing at which an image is captured by the normal camera regarding a same imaging target object.

8. A non-transitory computer-readable storage medium storing therein an image information acquisition program executed by an image information acquisition apparatus that acquires image information based on a captured image of surroundings of a vehicle, the image information acquisition program comprising, as processes performed by the image information acquisition apparatus:
   a process for acquiring whether a state of each of a plurality of cameras mounted in the vehicle is a normal state in which the captured image can be acquired or an abnormal state in which the captured image cannot be acquired; and
   a process for generating compensation target object image information that is the image information corresponding to an abnormal camera that is a camera among the plurality of cameras of which the state is the abnormal state, based on compensation source image information that is the image information based on the captured image acquired by a normal camera that is the camera among the plurality of cameras of which the state is the normal state; wherein
   the process for generating the compensation target object image information generates the compensation target object image information, based on: the compensation source image information; and a time difference between a timing at which an image should be captured by the abnormal camera and a timing at which an image is captured by the normal camera regarding a same imaging target object.

* * * * *